US008418567B2

(12) United States Patent
Hou

(10) Patent No.: US 8,418,567 B2
(45) Date of Patent: Apr. 16, 2013

(54) FLUID VISUAL INSPECTION DEVICE

(76) Inventor: Yao-Sung Hou, Kaohsiung (TW)

( * ) Notice: Subject to any disclaimer, the term of this patent is extended or adjusted under 35 U.S.C. 154(b) by 422 days.

(21) Appl. No.: 12/911,722

(22) Filed: Oct. 25, 2010

(65) Prior Publication Data

US 2011/0100138 A1    May 5, 2011

(30) Foreign Application Priority Data

Oct. 29, 2009    (TW) ................................ 98219975 U

(51) Int. Cl.
*G01F 1/28*    (2006.01)
*G01F 1/05*    (2006.01)

(52) U.S. Cl.
USPC ........................ 73/861.74; 73/861.79; 73/273

(58) Field of Classification Search .......................... None
See application file for complete search history.

(56) References Cited

U.S. PATENT DOCUMENTS 7,980,127 B1 *    7/2011    Hou ................................. 73/273
2011/0128814 A1 *    6/2011    Hanada ......................... 366/339

* cited by examiner

*Primary Examiner* — Harshad R Patel
(74) *Attorney, Agent, or Firm* — Muncy, Geissler, Olds & Lowe, PLLC

(57) ABSTRACT

A fluid visual inspection device includes a fluid visual inspection portion and one set of fastening caps. The fluid visual inspection portion includes a vane holder which has a first flange and second flange, and is coupled with a transparent duct to allow users to see vane conditions and judge whether fluid is flowing. The vane holder further has a third flange and fourth flange that have respectively an external threaded portion formed thereon screwing with the fastening caps. One end of the vane holder holds a partition to form a passage opening. Each fastening cap has one end fastened to the third or fourth flange and another end screwed with a fluid pipe. The fastening caps and the duct are not integrally formed, hence fabrication is simpler and the cost is lower and production time is shorter, and coupling of the device and fluid pipe also is easier.

5 Claims, 6 Drawing Sheets

FLUID VISUAL INSPECTION DEVICE

FIELD OF THE INVENTION

The present invention relates to a fluid visual inspection device and particularly to a fluid visual inspection device for visually inspecting flow condition of a fluid.

BACKGROUND OF THE INVENTION

Some of manufacture equipments now used in production processes are equipped with a fluid visual inspection device 10 on fluid visual inspection pipe for inspecting fluid flow condition. Referring to FIGS. 1 and 2, the conventional fluid visual inspection device 10 comprises a duct 11, a partition 12, an elastic element 13 and a fastening cap 14. The duct 11 has a transparent window 111 and houses a rotatable vane 112, and a threaded portion 113 at one end to couple with a fluid pipe and a flange 114 at another end formed at a smaller diameter with an external threaded portion 1141 formed thereon to be fastened to the fastening cap 14. The partition 12 has an aperture 121 and is held in the flange 114 with the elastic element 13 resting thereon. The fastening cap 14 has a first internal screw hole 141 at one end screwing with the external threaded portion 1141 of the flange 114 so that the fastening cap 14 compresses the duct 11 after screwing with the elastic element 13 butting one side of the partition 12. The fastening cap 14 has a second internal screw hole 142 at another end to couple with the fluid pipe. The pipe coupled with the fastening cap 14 is inlet side, while the one coupled with the duct 11 is outlet side. When fluid flows in through the fastening cap 14, it passes through the aperture 121 of the partition 12 and enters the duct 11 to drive the vane 112 to generate rotation, then flows out through the duct 11. Thus fluid flow condition can be determined.

Although the conventional fluid visual inspection device 10 mentioned above can be used to determine fluid flow condition, it usually is formed integrally with the duct 11. Fabrication and assembly are difficult and more costly, and require longer production time. Coupling of the fluid visual inspection device 10 and the fluid pipe also is more difficult.

SUMMARY OF THE INVENTION

In view of the problems of the conventional fluid visual inspection device that is formed integrally with the duct and results in production difficulty and higher cost and difficult coupling with the fluid pipe, the present invention aims to provide an improved fluid visual inspection device that can be fabricated easier at a lower cost and has one set of fastening caps screwing with a fluid pipe by screwing to make total assembly and installation simpler.

The fluid visual inspection device according to the invention includes a fluid visual inspection portion and one set of fastening caps. The fluid visual inspection portion includes a vane holder, a vane, a transparent duct, a partition and a plurality of rubber pads. The vane holder is a hollow barrel with mating holding bars. The vane is hinged on the holding bars. The vane holder also includes a first flange and a second flange extended from two ends of the holding bars with respectively a plurality of first grooves and second grooves formed thereon for accommodating the rubber pads. The vane holder further has a third flange and a fourth flange extended from two ends of the first and second flanges that have respectively an external threaded portion mating the fastening cap for screwing therewith, and a first stop ring interposed between the first and third flanges, and a second stop ring interposed between the second and fourth flanges. The transparent duct is coupled with the vane holder from an outer side with a transparent window located outside the vane holder. The partition is semicircular and held on one end of either the third or fourth flange, and has an upper side spaced from the vane holder to form a passage opening in a direction aligned with the vane. Each fastening cap has one end formed an internal screw hole mating the external threaded portion of the third and fourth flanges to be fastened therewith, and another end formed a polygonal flange with a screw opening formed therein communicating with the internal screw hole.

The holding bars of the vane holder have respectively an aperture, and the vane has a strut with two ends hinged on the apertures.

The rubber pads are coupled on the first and second grooves of the first and second flanges.

The first stop ring is interposed between the first and third flanges, the second stop ring is interposed between the second and fourth flanges, and the semicircular partition butts either the first or second stop ring on an outer side thereof.

The fluid visual inspection device thus formed can provide many advantages, notably:

1. The transparent window on the vane holder allows users to see a condition of the vane to judge whether the fluid flows. The third and fourth flanges at two ends of the vane holder are formed symmetrically, hence the partition can be installed more flexibly by selecting one of the flanges at one end to serve as the fluid inlet without constraint. Installation is simpler and practicality improves.

2. The fastening cap and fluid pipe are coupled by screwing, and is not integrally formed with the vane holder. Thus fabrication is simpler and cost is lower, and production time also can be reduced. Coupling with the fluid pipe also is easier and more time efficient.

The foregoing, as well as additional objects, features and advantages of the present invention will be more readily apparent from the following embodiment and detailed description, which proceeds with reference to the accompanying drawings.

DETAILED DESCRIPTION OF THE PREFERRED EMBODIMENT

Figure 1:
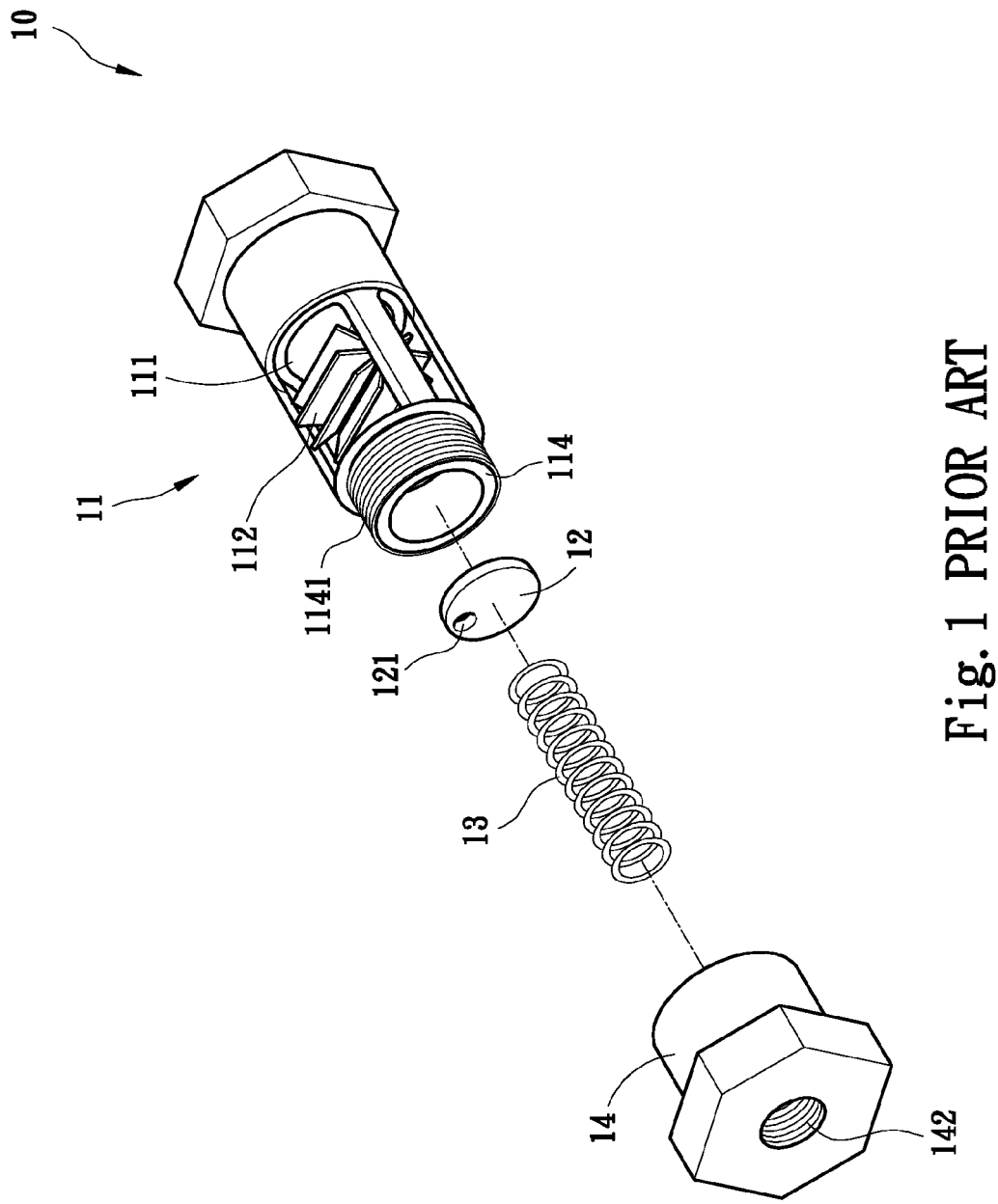
FIG. 1 is an exploded view of a conventional fluid visual inspection device.
Figure 2:
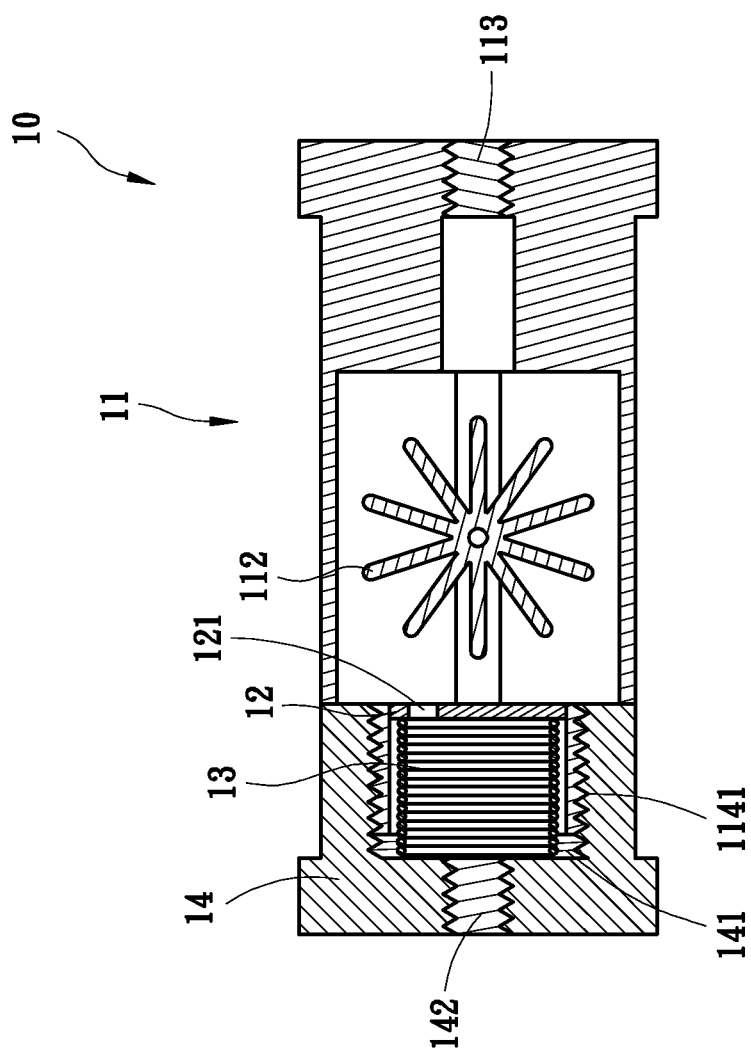
FIG. 2 is a sectional view of a conventional fluid visual inspection device.
Figure 3:
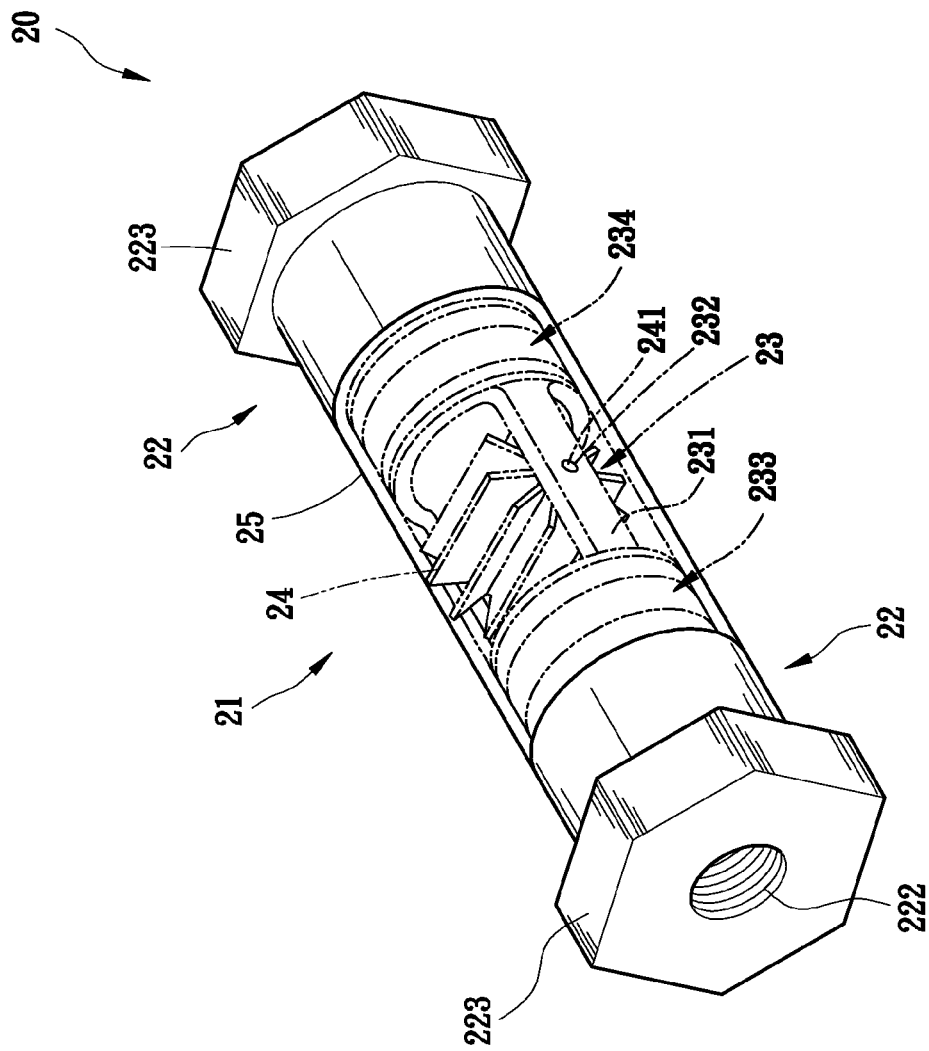
FIG. 3 is a perspective view of the fluid visual inspection device of the present invention.
Figure 4:
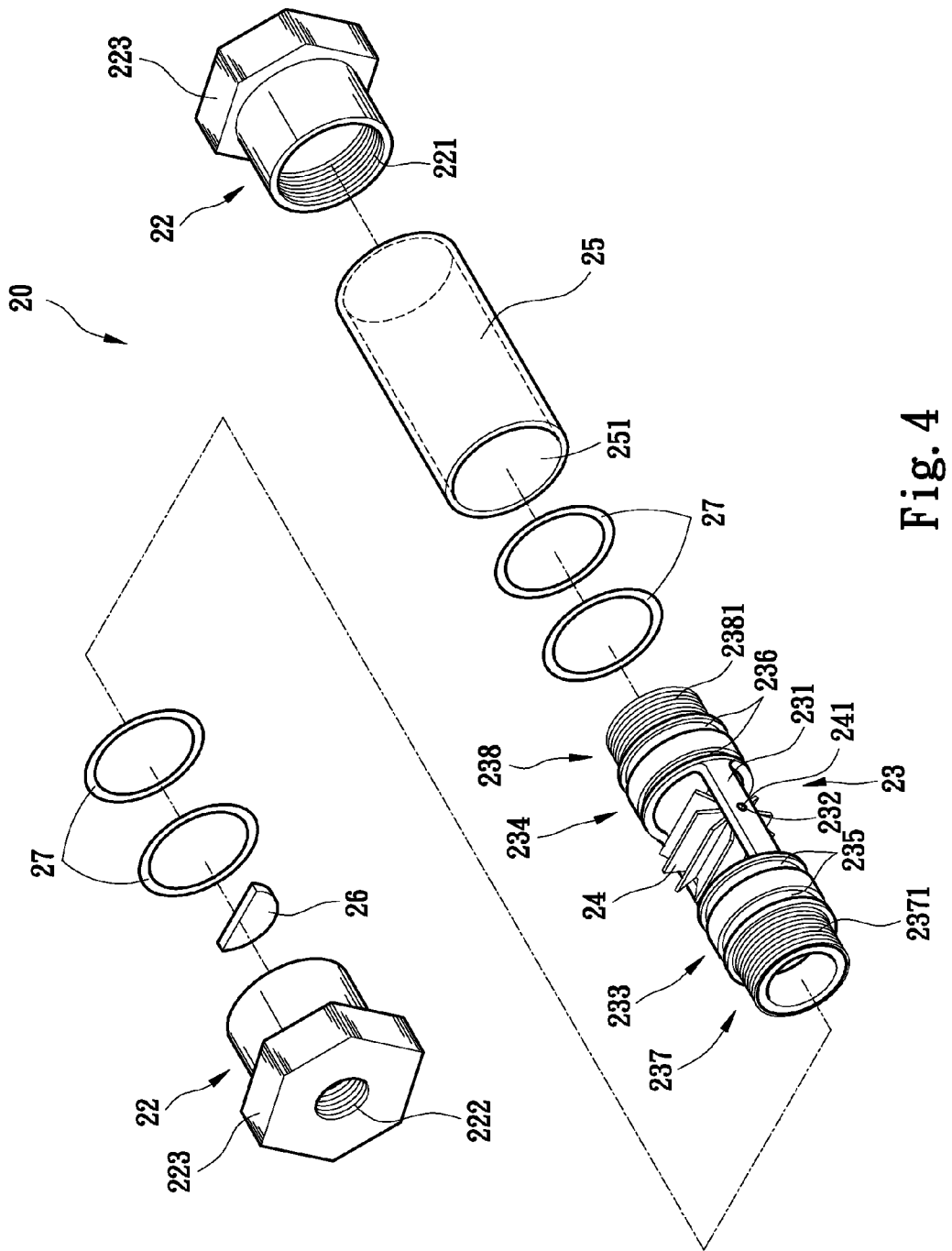
FIG. 4 is an exploded view of the fluid visual inspection device of the present invention.
Figure 5:
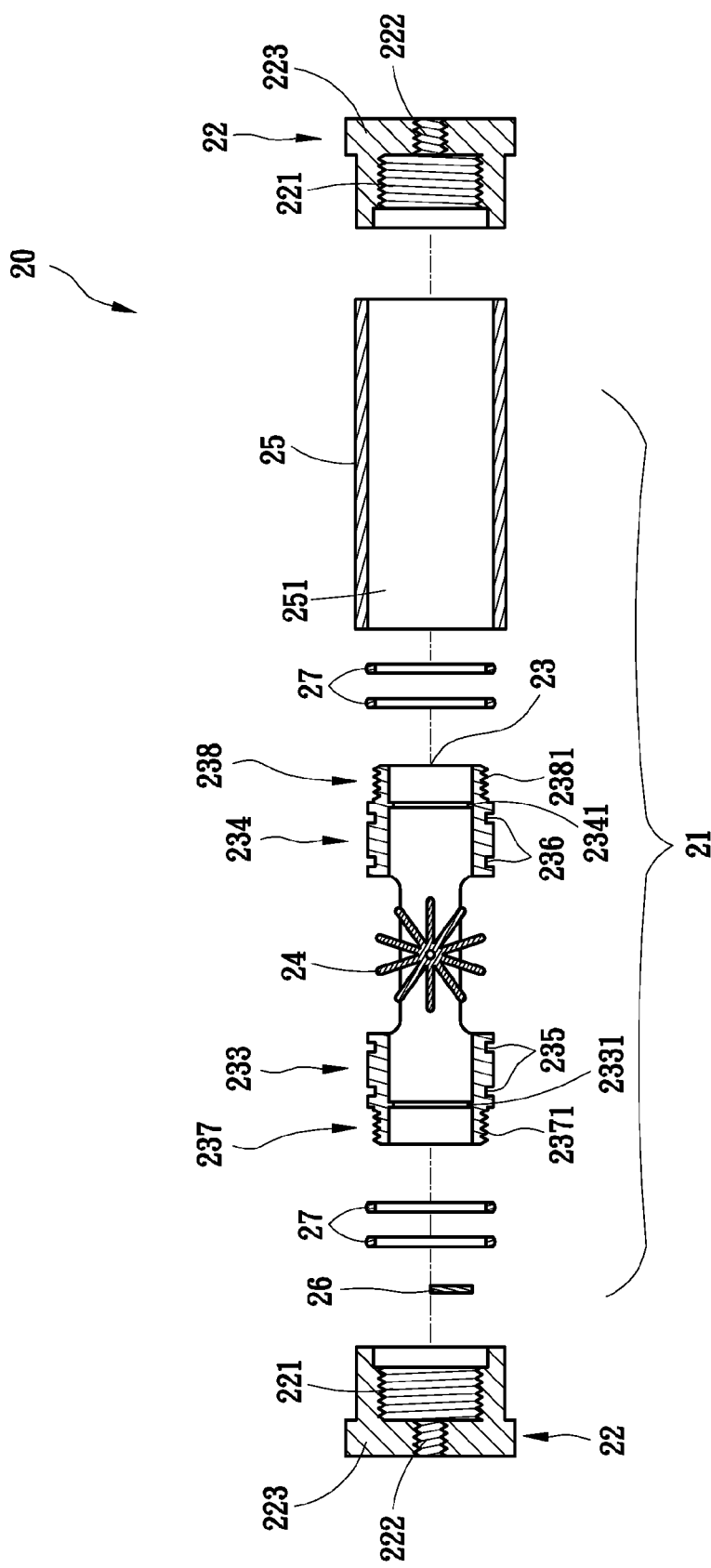
FIG. 5 is a sectional exploded view of the fluid visual inspection device of the present invention.

Please referring to FIGS. 3, 4 and 5, the present invention provides a fluid visual inspection device 20 which includes a fluid visual inspection portion 21 and one set of fastening caps 22. The fluid visual inspection portion 21 includes a vane holder 23, a vane 24, a transparent duct 25, a partition 26 and a plurality of rubber pads 27.

The vane holder 23 is a hollow barrel with mating holding bars 231 each has an aperture 232 corresponding to each other and hinged by each of two ends of a strut 241 located on the vane 24. The vane holder 23 also has a first flange 233 and a second flange 234 extended from two ends of the holding bars 231 that have respectively a plurality of first grooves 235 and second grooves 236 formed thereon for accommodating the rubber pads 27. In this embodiment, the first and second flanges 233 and 234 have respectively two sets of the first and second grooves 235 and 236 formed thereon, and also a third flange 237 and a fourth flange 238 extended from two ends thereof that have respectively an external threaded portion 2371 and 2381 formed thereon to screw with the fastening caps 22. The first and third flanges 233 and 237 are interposed by a first stop ring 2331, and the second and fourth flanges 234 and 238 are interposed by a second stop ring 2341. The partition 26 butts an outer side of the first stop ring 2331 or the second stop ring 2341.

The transparent duct 25 has an opening 251 to hold the vane holder 23 with two ends aligned respectively with the first and second flanges 233 and 234 at two ends of the vane holder 23 so that the transparent duct 25 becomes a transparent visual window of the vane holder 23.

The partition 26 is semicircular and held on one end of the third flange 237 or the fourth flange 238, and has an upper side formed a passage opening 261 with the vane holder 23. The passage opening 261 is aligned with the direction of the vane 24. In this embodiment the partition 26 is located on an outer side of the first stop ring 2331 held on the third flange 237 so that the passage opening 261 formed on the third flange 237 is semicircular and becomes a fluid inlet(referring to FIG. 6).

The fastening cap 22 has an internal screw hole 221 at one end to be screwed with either the external threaded portion 2371 or 2381 of the third flange 237 or fourth flange 238 to be positioned outside thereof. The fastening cap 22 has another end formed a polygonal flange 223 with a screw opening 222 formed thereon communicating with the internal screw hole 221.

Figure 6:
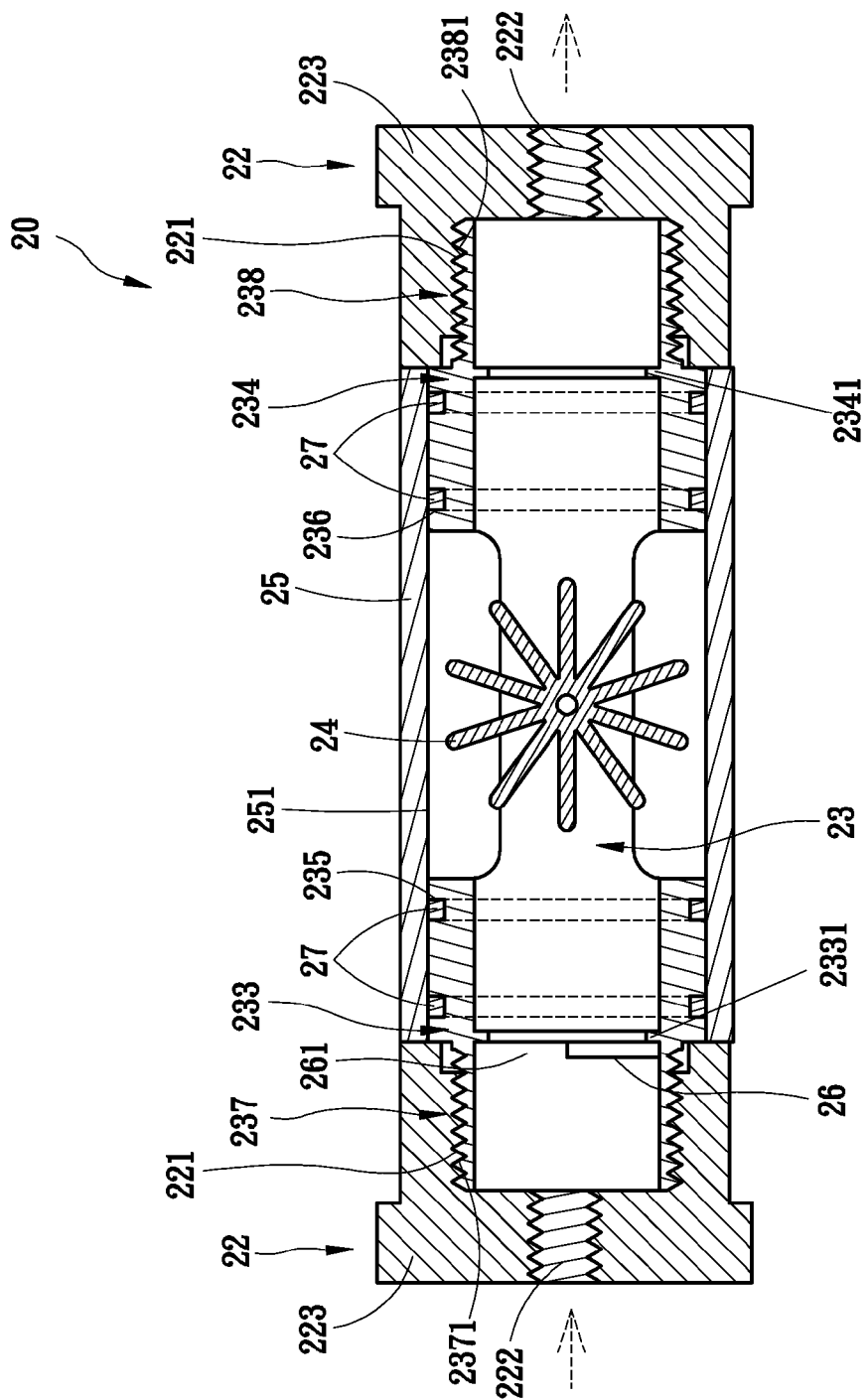
FIG. 6 is a schematic view of the fluid visual inspection device of the present invention showing fluid flow condition.

After assembly of the fluid visual inspection device 20 is finished, referring to FIGS. 3 and 6, the screw opening 222 at the fastening caps 22 at two ends thereof can be coupled with a fluid pipe (not shown in the drawings). Through the rubber pads 27 coupled on the first and second grooves 235 and 236 of the first and second flanges 233 and 234, the transparent duct 25 can be tightly coupled on the vane holder 23 to prevent fluid from leaking during flowing. As one end of the vane holder 23 where the partition 26 is located is the fluid inlet (shown by the arrow in FIG. 6), and another end is the fluid outlet, when the fluid flows into the inlet end and passes through the semicircular passage opening 261 formed between the partition 26 and vane holder 23, it drives the vane 24 rotating, then flows out through the outlet. Through the transparent duct 25 whether the vane 24 is still or moving can be seen and fluid flow condition can be judged by users. The third and fourth flanges 237 and 238 at two ends of the vane holder 23 are symmetrical, and the partition 26 can be selectively installed either on the third or fourth flange 237 or 238 to serve as the fluid inlet. The fastening caps 22 coupled with the fluid pipe and the vane holder 23 are not formed integrally, hence fabrication is simpler and the cost is lower, and production time also can be reduced. Coupling of the fastening cap 22 and the fluid pipe also is easier.

What is claimed is:

1. A fluid visual inspection device, comprising at least:
    a fluid visual inspection portion including a vane holder, a vane, a transparent duct, a partition and a plurality of rubber pads, the vane holder being a hollow barrel and having mating holding bars, the vane being hinged on the holding bars, the vane holder also including a first flange and a second flange extended from two ends of the holding bars and a third flange and a fourth flange extended from two ends of the first and second flanges that have respectively an external threaded portion, the transparent duct being coupled on the vane holder from an outer side, the partition being located at one end of the third or fourth flange and having an upper side to form a passage opening with the vane holder; and
    one set of fastening caps each including an internal screw hole at one end mating the external threaded portion of the third and fourth flanges and screw opening at another end communicating with the internal screw hole.

2. The fluid visual inspection device of claim 1, wherein the holding bars of the vane holder include respectively an aperture, the vane including a strut which includes two ends hinged on the aperture.

3. The fluid visual inspection device of claim 1, wherein the first and second flanges include respectively two sets of first grooves and second grooves for accommodating the rubber pads.

4. The fluid visual inspection device of claim 1, wherein the first and third flanges are interposed by a first stop ring, and the second and fourth flanges are interposed by a second stop ring, such that the partition butting an outer side of the first stop ring or the second stop ring.

5. The fluid visual inspection device of claim 1, wherein the partition is semicircular.

* * * * *